United States Patent
Burdeska

[11] 3,907,839
[45] Sept. 23, 1975

[54] PROCESS FOR THE MANUFACTURE OF TETRAARYLOXYBENZOQUINONES

[75] Inventor: Kurt Burdeska, Basel, Switzerland

[73] Assignee: Ciba-Geigy Corporation, Ardsley, N.Y.

[22] Filed: Apr. 30, 1973

[21] Appl. No.: 355,981

[30] Foreign Application Priority Data
May 9, 1972 Switzerland.......................... 6871/72

[52] U.S. Cl. .......................... 260/396 R; 260/246 R
[51] Int. Cl.² .......................................... C07C 49/64
[58] Field of Search .................................. 260/396 R

[56] References Cited
UNITED STATES PATENTS
2,908,692  10/1959  Rickert .......................... 260/396 N OTHER PUBLICATIONS
Chemical Abstracts, 63:18252 (1965).

*Primary Examiner*—Vivian Garner
*Attorney, Agent, or Firm*—Nestor W. Shust

[57] ABSTRACT

Process for the manufacture of tetraaryloxybenzoquinones of the formula

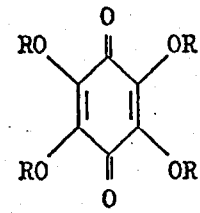

wherein R denotes an aromatic radical, characterised in that a tetrahalogeno-1,4-benzoquinone is reacted with an alkali metal salt of an aromatic hydroxy compound in the molar ratio of 1:4, in an aprotic hydrophilic polar organic solvent.

5 Claims, No Drawings

PROCESS FOR THE MANUFACTURE OF TETRAARYLOXYBENZOQUINONES

It has been found that tetraaryloxybenzoquinones of the formula

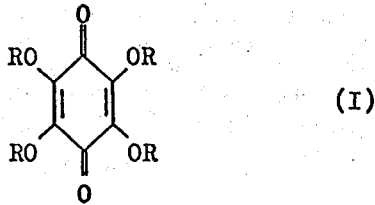

(I)

in which R is an aromatic radical are obtained when tetrahalogeno-1,4-benzoquinones are reacted with alkali metal salts of aromatic hydroxy compounds, in the molar ratio of 1:4, in an aprotic hydrophilic polar organic solvent.

Examples of tetrahalogeno-1,4-benzoquinones which are used are tetrafluoro-, tetrabromo- or especially tetrachloro-1,4-benzoquinone (Chloranil).

Suitable aromatic hydroxy compounds are both monocyclic and polycyclic, isocyclic and heterocyclic hydroxy compounds.

Hydroxy compounds of particular interest are those of the formula

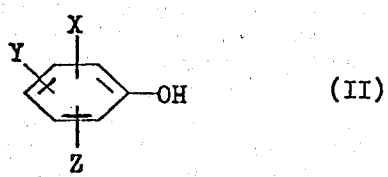

(II)

wherein X and Y denote hydrogen or halogen atoms, alkyl, alkoxy, alkoxyalkyl or alkoxyalkoxy groups, trifluoromethyl, nitro, lower alkylsulphonyl, alkanoyl or alkoxycarbonyl groups, or phenyl, phenoxy or benzoyl groups which are optionally substituted by halogen atoms or lower alkyl or alkoxy groups, and Z denotes a hydrogen or halogen atom or a lower alkyl group, or wherein the radicals X and Y form a fused benzene ring or hetero ring.

In the definitions which have been given, and in the subsequent definitions, the term "lower" denotes that the substituents to which it relates possess 1 to 6 carbon atoms.

The following aromatic hydroxy compounds may be mentioned as examples: Phenol, 2-, 3- or 4-chlorophenol, 2,3-, 2,4-, 2,5-, 3,4- or 3,5-dichlorophenol, 2,4,5-, 2,4,6-, 2,3,4- or 3,4,5-trichlorophenol, 4-bromophenol, 2,4-dibromophenol, 2-, 3- or 4-methylphenol, 2,3-, 2,4-, 3,4- or 3,5-dimethylphenol, 4-tert.-butylphenol, 4-sec.-butylphenol, 4-α,α,γ,γ-tetramethylbutylphenol, 2-sec.-butyl-4-tert.-butylphenol, 2-phenylphenol, 2-, 3- or 4-methoxyphenol, 2-ethoxyphenol, 4-phenoxyphenol, 3-trifluoromethylphenol, 4-acetylphenol, 4-hydroxybenzophenone, salicylic acid methyl ester, salicylic acid anilide, p-hydroxybenzoic acid ethyl ester, 4-methylsulphonylphenol, α-naphthol, β-naphthol, 5,6-,7,8-tetrahydro-2-naphthol, 3-hydroxypyridine, 2-hydroxydiphenylene oxide, 3-hydroxyfluorene, 2-hydroxycarbazole and 2-hydroxyanthraquinone.

The hydrophilic aprotic organic solvents which are used are appropriately those which have a dielectric constant of at least 30° at 25°C.

The aprotic dipolar organic solvents are compounds which cannot split off hydrogen as a proton under the reaction conditions, such compounds being defined, for example, by A.J. Parker in "The use of dipolar aprotic solvents", Advance in Org. Chem., volume 5, pages 3 to 4.

The dielectric constant of these solvents is hereafter denoted by $\epsilon$ and is quoted from A.J. Parker, l.c., and Landolt-Bornstein, "Zahlenwerte und Funktionen", volume 2, part 6(1959).

Suitable aprotic dipolar organic solvents according to the definition are, for example, dimethylformamide ($\epsilon = 37.6$), dimethylacetamide ($\epsilon = 37.8$), dimethylsulphoxide ($\epsilon = 48.9$), tetramethylenesulphone (sulpholane)($\epsilon = 45.5$), acetonitrile ($\epsilon = 34.8$) and N-methylpyrrolidone ($\epsilon = 33.1$) as well as their mixtures.

The reaction is appropriately carried out by dissolving or suspending the tetrahalogenobenzoquinone and the aromatic hydroxy compound in the solvent and adding to the mixture an aqueous sodium hydroxide solution or potassium hydroxide solution, whereby the alkali metal salt of the aromatic hydroxy compound is produced, which then reacts with the tetrahalogenobenzoquinone.

The reaction is appropriately carried out at temperatures below 0°C, preferably at −5° to −20°C.

Working up is advantageously carried out by pouring the reaction mixture into water, whereupon the tetraaryloxybenzoquinone precipitates in a pure form and can be isolated by filtration. It is a valuable intermediate product which is above all suitable for the manufacture of dioxazine dyestuffs. Reaction of the tetraaryloxybenzoquinones with aromatic amines in the molar ratio of 1:2 yields the 2,5-diaryloxy-3,6-diarylaminobenzoquinones, which can be converted by cyclisation into the corresponding triphendioxazines, which are valuable pigment dyestuffs.

With the exception of the unsubstituted tetraphenoxybenzoquinone, the manufacture of which in a two-stage process is described in the American Chemical Journal XVIII, pages 46 to 47 (1895), the products obtained according to the invention are new compounds.

According to the known process for the manufacture of tetraphenoxyquinone which has been mentioned, chloranil is first reacted with 2 mols of potassium phenolate to give dichlorodiphenoxy-benzoquinone and the latter is reacted with an aqueous potassium phenolate solution to give tetraphenoxyquinone. Whilst no yields are quoted, repetition of the instructions in the literature gives yields of only 40 to 45% of theory. Compared to this, the process according to the invention, which permits the manufacture of tetraphenoxyquinone in very good yield and in one step, denotes an important technical advance. Whilst it is mentioned that the tetraphenoxyquinone can also be obtained in one step by reaction of chloranil with an aqueous potassium phenolate solution in the molar ratio of 1:4, it is stated that the two-stage process gives better yields.

In the examples which follow, the percentages, unless otherwise stated, denote percentages by weight.

EXAMPLE 1

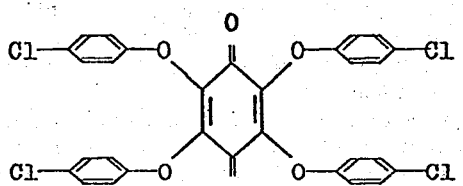

(III)

73.8 g of finely powdered 2,3,5,6-tetrachloro-1,4-benzoquinone and 159 g of 4-chlorophenol are introduced into 550 g of acetonitrile and the mixture is cooled to −10°C. 141 g of a 48.6% strength aqueous potassium hydroxide solution are now run into this suspension over the course of 50 minutes whilst stirring well, at −10° to −8°C. A brown-yellow suspension, which is thick but can still be stirred readily, results, and is stirred for a further 1½ hours at −5° to 0°C. To complete the reaction, the temperature is allowed to rise overnight to room temperature and thereafter the suspension is allowed to run into 3 l of water. After adding 110 ml of concentrated sulphuric acid, the mixture is well stirred for a further 10 minutes at room temperature and is then filtered. The yellow-brown product is washed with a large amount of hot water and then with alcohol, and is dried at 110°C in vacuo. The yield is 161 g or 87.5% of theory. The product crystallises from 1,2-dichlorobenzene in red-yellow crystals. Melting point: 240° to 241°C.

EXAMPLE 2

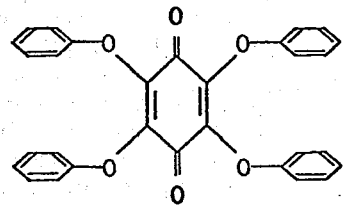

(IV)

73.8 g of 2,3,5,6-tetrachloro-1,4-benzoquinone and 116 g of phenol are introduced into 480 g of dimethylacetamide and the mixture is cooled to −15°C. At this temperature, 141 g of a 48.6% strength aqueous potassium hydroxide solution is now allowed to run in over the course of 1 hour, whilst stirring well. The resulting yellow-brown thick suspension is stirred for a further 2 hours at −5° to 0°C and is then stirred overnight at room temperature. Thereafter it is stirred into 4½ l of water and after adding 110 ml of concentrated sulphuric acid the whole is well stirred for 10 minutes. The product obtained is filtered off and washed with water and alcohol as indicated in Example 1. Yield, 121 g, or 86% of theory, of red-yellow crystals. The product crystallises from 1,2-dichlorobenzene in orange-red crystals. Melting point: 227° to 229°C.

EXAMPLE 3

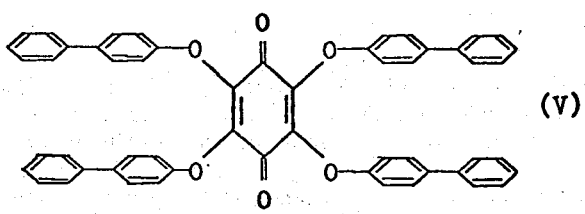

(V)

136 g of 4-hydroxydiphenyl are dissolved in 380 g of dimethylformamide and after adding 49.2 g of finely powdered 2,3,5,6-tetrachloro-1,4-benzoquinone, the mixture is cooled to −10°C. 90.3 g of a 49.6% strength aqueous potassium hydroxide solution are now added dropwise over the course of one hour at −10° to −5°C whilst stirring well. The resulting moist suspension is stirred for a further 4 hours at −5° to 0°C and is then stirred overnight at room temperature to complete the reaction. Thereafter the suspension is allowed to run into 2 litres of water, the mixture is acidified with concentrated sulphuric acid and filtered, and the product is washed with water until neutral. The product is purified by suspending it in 1½ litres of water and heating to 90°C for 30 minutes. It is filtered off whilst still hot, washed with hot water and then with alcohol, and dried in vacuo at 100°C. Yield 140 g or 90% of theory. The quinone crystallises from nitrobenzene in fine brown-violet crystals. Melting point: 308° to 310°C.

EXAMPLE 4 TO 32

The table which follows describes the manufacture of further tetraaryloxybenzoquinones of the formula (VI) by reacting 1 mol of chloranil with 4 mols of the phenol indicated in column II, in accordance with the instructions of Example 1.

Table I

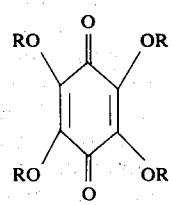

(VI)

| Example No. | Phenol | Colour of the crystals | Melting Point °C |
|---|---|---|---|
| 4 | o-Chlorophenol | Yellow (from o-dichlorobenzene) | 202 – 204 |
| 5 | m-Chlorophenol | Yellow (chlorobenzene) | 141 – 142 |
| 6 | 2,4-Dichlorophenol | Red-yellow (o-dichlorobenzene) | 198 – 200 |
| 7 | 3,4-Dichlorophenol | Brown-yellow (o-dichlorobenzene) | 205 – 206 |
| 8 | 3,5-Dichlorophenol | Brown-yellow (o-dichlorobenzene) | 259 – 260 |

Table I — Continued

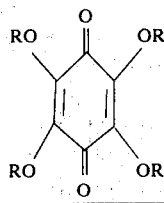

(VI)

| Example No. | Phenol | Colour of the crystals | Melting Point °C |
|---|---|---|---|
| 9 | 2,5-Dichlorophenol | Red (from o-dichlorobenzene) | 251 – 253 |
| 10 | 2,4,5-Trichlorophenol | Red-yellow (o-dichlorobenzene) | 266 – 267 |
| 11 | 2,4,6-Trichlorophenol | Red-yellow (chlorobenzene) | 246 – 248 |
| 12 | 2,3,4-Trichlorophenol | Yellow (from o-Dichlorobenzene) | 267 – 268 |
| 13 | 3,4,5-Trichloro- | Red-brown (from o-dichlorobenzene) | 271 – 272 |
| 14 | 4-Bromphenol | Orange-red (from o-dichlorobenzene) | 277 – 278 |
| 15 | 2,4-Dibromophenol | Red-yellow (from chlorobenzene) | 224 – 225 |
| 16 | 4-Chloro-3-methyl- | Brown (from chlorobenzene) | 206 – 207 |
| 17 | 4-Chloro-3,5-dimethylphenol | Brown-yellow (o-dichlorobenzene) | 294 – 295 |
| 18 | 4-Methylphenol | Red-yellow (from chlorobenzene) | 200 – 202 |
| 19 | 3,4-Dimethylphenol | Red-brown (from ethylene glycol monoethyl ether) | 168 – 169 |
| 20 | 3,5-Dimethylphenol | Red-brown (from chlorobenzene) | 230 – 231 |
| 21 | 4-tert.-Butyl | Orange-red (from ethylene glycol monoethyl ether) | 219 – 220 |
| 22 | 4-Sec.Butylphenol | Red (from ethylene glycol monoethyl ether) | 152 – 153 |
| 23 | 2-sec.Butyl-4-tert.butylphenol | Yellow (from ethylene glcyol monoethyl ether) | 130 – 131 |
| 24 | 4,α,α,γ,γ-Tetramethyl- butylphenol | Orange (from cellosolve) | 157 – 159 |
| 25 | 2-Methoxyphenol | Brown-red (from 1,2-dichlorobenzene) | 221 – 222 |
| 26 | 3-Methoxyphenol | Brown-violet (from o-dichlorobenzene) | 224 – 224 |
| 27 | 4-Phenoxyphenol | Orange-red (from chlorobenzene) | 192 – 193 |
| 28 | 2-Phenylphenol | Red-brown (from chlorobenzene) | 208 – 210 |
| 29 | 4-Benzoylphenol | Orange (from o-dichlorobenzene) | 204 – 206 |
| 30 | 3-Trifluoromethyl | Orange-red (from chlorobenzene) | 162 – 164 |
| 31 | β-Naphthol | Brown (from nitrobenzene) | 300 |
| 32 | 4-Methylsulphonyl-phenol | Yellow (from nitrobenzene) | 300 |
| 33 | 4-Anilinophenol | Blue (from o-dichlorobenzene) | 223 – 24 |
| 34 | 4-Hydroxystilbene | Red-brown (from o-dichlorobenzene) | 287 – 89 |
| 35 | 4-Hydroxyazobenzene | Reddish-brown (from o-dichlorobenzene | 250 – 52 |
| 36 | 4-Hydroxybenzoic acid methyl ester | yellow-orange (from chlorobenzene) | 221 – 23 |
| 37 | Salicylic acid anilide | Red (from chlorobenzene) | 217 – 18 |

EXAMPLE 38

31.2 g of 2,3,5,6-tetra-[2'4'5'-trichlorophenoxy]-1,4-benzoquinone and 14.7 g of 3-amino-N-ethylcarbazole in a mixture of 140 ml of ethanol and 60 ml of ethylene glycol monoethyl ether are heated to 70°C. After adding 5.5 g of triethylamine the mixture is heated to the boil for 8 hours, whilst stirring. The product which has precipitated is filtered off at 60°C, washed with alcohol and dried in vacuo at 100°C. 26.5 g of red-brown crystals are obtained.

25.6 g of the dianil are heated with 200 ml of 1,2-dichlorobenzene and 3.7 ml of benzene sulphochloride to 175° – 180°C and stirred for 5 hours at this temperature. After cooling to 120°C, the dyestuff which has precipitated, of the formula

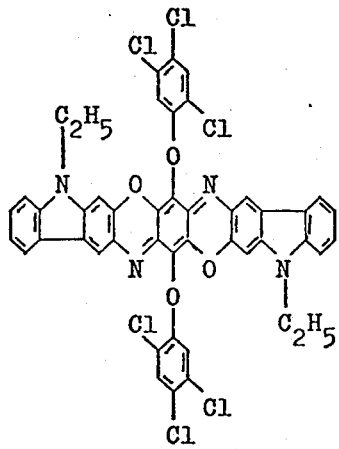

(VII)

is filtered off, washed with 1,2-dichlorobenzene at 120°C, then with alcohol, and dried in vacuo at 100°C. The yield is 22.5 g of green crystals having a metallic sheen.

15 g of this crude product are ground for 3 hours with 70 g of anhydrous calcium chloride in a vibration mill, containing 3,600 kg of iron balls, each of 15 mm diameter. The ground material is then extracted with dilute hydrochloric acid and the residue is filtered off, washed with water and dried in vacuo at 60°C. A pure reddish-tinged blue, strongly coloured pigment is obtained, which has very good fastness to overlacquering, migration and light.

What we claim is:

1. A process for the manufacture of tetraaryloxybenzoquinones of the formula

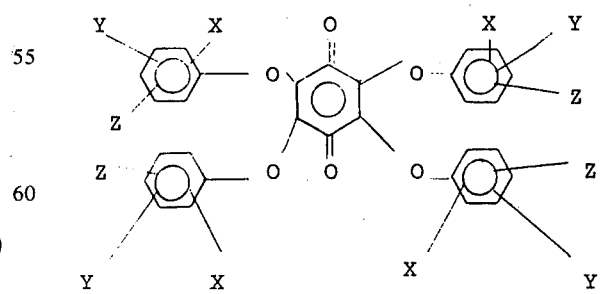

wherein X and Y denote hydrogen or halogen atoms, alkyl, alkoxy, alkoxyalkyl or alkoxyalkoxy groups, trifluoromethyl, nitro, lower alkylsulphonyl, alkanoyl or alkoxycarbonyl groups, or phenyl, phenoxy or benzoyl groups and Z denotes a hydrogen or halogen atom or a lower alkyl group, said process consisting essentially of reacting at a temperature below 0°C tetrachloro-1,4-benzoquinone with an alkali metal salt of an aromatic hydroxy compound having the formula

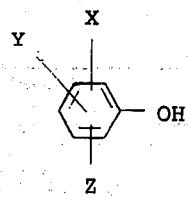

in the molar ratio of 1:4 in an aprotic hydrophilic polar organic solvent having a dielectric constant of at least 30 at 25°C.

2. Process according to claim 1 characterised in that an amide of a lower fatty acid is used as the organic solvent.

3. Process according to claim 2, characterised in that dimethylformamide or dimethylacetamide is used.

4. Process according to claim 1, characterised in that dimethylsulphoxide or acetonitrile is used as the organic solvent.

5. Process according to claim 1, characterised in that it is carried out in the presence of water.

* * * * *